United States Patent [19]

Davy

[11] Patent Number: 5,517,643
[45] Date of Patent: May 14, 1996

[54] METHOD OF ALLOCATING MEMORY AMONG A PLURALITY OF PROCESSES OF A COMPUTER SYSTEM

[75] Inventor: William Davy, Dublin, Ohio

[73] Assignee: Raxco Incorporated, Rockville, Md.

[21] Appl. No.: 29,972

[22] Filed: Mar. 10, 1993

Related U.S. Application Data

[63] Continuation of Ser. No. 266,072, Nov. 2, 1988, abandoned.
[51] Int. Cl.$^6$ ..................................................... G06F 12/02
[52] U.S. Cl. ................... 395/650; 364/281.6; 364/281.0; 364/281.8; 364/DIG. 1
[58] Field of Search .................. 364/DIG. 1, DIG. 2; 395/650, 600, 775, 800, 425

[56] References Cited

U.S. PATENT DOCUMENTS

| 4,428,064 | 1/1984 | Hempy et al. | 364/900 |
| 4,467,411 | 8/1984 | Fry et al. | 364/200 |
| 4,603,382 | 7/1986 | Cole et al. | 364/200 |
| 4,805,134 | 2/1989 | Calo et al. | 364/900 |
| 4,849,877 | 7/1989 | Bishop et al. | 364/200 |

OTHER PUBLICATIONS

Dictionary of Computers, Information Processing, and Telecommunications, 2nd Edition, 1987, p. 270.
Webster's II, New Riverside University Dictionary, 1988, p. 580.
"Dynamic Load Balancer Gets Most Of Hardware System", Digital News, Oct. 19, 1987.

Primary Examiner—Thomas G. Black
Assistant Examiner—Maria N. Von Buhr

[57] ABSTRACT

A method of dynamically tuning a computer system including a memory having a plurality of pages which is subjected to varying system loads based on the number of processes handled by the computer system is provided. Each process has an associated run priority. First, the current system load is determined. The current system load is then compared with the system load for which the computer system has been statically tuned. The computer system is statically tuned by the setting of tuning parameters. Finally, the tuning parameters are dynamically adjusted to tune the computer system to the current system load.

18 Claims, 8 Drawing Sheets

METHOD OF ALLOCATING MEMORY AMONG A PLURALITY OF PROCESSES OF A COMPUTER SYSTEM

This application is a continuation of application Ser. No. 07/266,072, filed Nov. 2, 1988, now abandoned.

BACKGROUND OF THE INVENTION

The present invention generally relates to a method of memory and CPU time allocation for a multi-user computer system and, more specifically, to a method of memory and CPU time allocation responsive to the system load of the multi-user computer system.

In 1977, Digital Equipment Corporation (DEC) introduced a new line of 32-bit minicomputers designated as the VAX™ (Virtual Address Extension) series. The VAX computer was released with a proprietary operating system called VMS™ (Virtual Memory System). VAX and VMS are registered trademarks of Digital Equipment Corporation.

The initial target market for the VAX series was the scientific and engineering communities. However, the market has now expanded to include the full range of data processing from large scale on-line transaction processing to single user workstations. Although the VAX architecture and operating system have functioned well throughout this expansion, some glaring inefficiencies of the operating system exist. Most of these inefficiencies are related to memory management.

The speed of the VAX CPU is determined by two factors: (1) the time it takes to process instructions in the CPU; and (2) the time it takes to access memory to fetch or store the data needed by the instructions. When the memory is accessed to fetch data needed by the instructions, the CPU waits on the access. These waits do not show as idle or "null" time—the CPU appears busy. These waits may be prolonged by other activity in the memory controller or on the CPU bus. In most VAX applications, the CPU speed is underutilized. The CPU spends a considerable portion of the time idle while it waits on the memory controller.

When a user logs on to the system at a terminal, the user becomes a "process" recognized by the system and is assigned an identification code. The user may then run programs and otherwise utilize the computer system. As used herein, process will generally refer to a logged-in user or an active terminal. Under VMS, each user is allocated a working set at log-in. A working set is a collection of pages (each page having 512 bytes) of physical memory where the user's work will be held. WSLIMIT denotes the maximum size of a process working set at any point in time. The actual size of the working set may be below WSLIMIT at a given time but, typically, is not. WSLIMIT is dynamic and may be changed as often as once per second for active processes. Usually, only a small fraction of the memory space which a process may legally access is in the working set at a given time.

When a process attempts to reference a page which is legally accessible, but is not currently in the working set, a page fault is generated and steps are taken to insert the page into the working set. If the actual size of the working set is at WSLIMIT, a page is removed from the working set and the needed page is located. If the page is located and it is determined that the page is not currently in physical memory, it is placed in physical memory. Thus, the required page of physical memory is made directly accessible to the process.

Page faults consume system resources. If avoided, faster system operation and program execution are achieved. Generally, the larger a working set, the fewer page faults that occur since more pages are directly accessible to the process. However, few processes, during any short time interval, access all or even a large fraction of the total pages legally accessible to the process. Therefore, even working sets that are a small fraction of the total size of a process can result in relatively small rates of faulting.

FIG. 1 illustrates VMS memory page movements. Data may be loaded into working set 10 from image file 15 or run-time libraries 20. Under heavy system load, read-only pages in working set 10 may be moved to Free Page List 25 while writable pages may be moved from working set 10 to Modified Page List 30. Free Page List 25 and Modified Page List 30 are emptied on a first-in first-out (FIFO) basis. As schematically illustrated, free pages are made available to working sets while writable pages are written to page file 40 or mapped section file 45. Under certain circumstances, the entire contents of a working set can be moved to a swap file, thereby releasing physical memory directly to Free Page List 25.

Moving pages back into working set 10 from Free Page List 25 or Modified Page List 30 utilizes few computer resources and is the preferred method of running an interactive system. These page movements are called soft faults. Moving pages from image file 15 or page file 40 back into working set 10 requires physical access to an I/O device such as a disk and therefore requires substantial time and computer resources (resource intensive). These page movements are called hard faults. Swap file retrievals are also hard faults but are easier on resource consumption since fewer I/O operations are generally required to retrieve similar amounts of data.

VMS includes a facility called Automatic Working Set Adjustment (AWSA), the operation of which is graphically illustrated in FIG. 2. Curve 70 represents the variation over time of the optimum or desired working set size for a given process. Line segments 75 represent the working set size limit WSLIMIT, discussed above, over time as generated by AWSA. Cross-hatched regions 76 represent times during which the working set size limit generated by AWSA is greater than the optimum working set size while solid regions 77 represent times during which the actual working set size limit is less than the optimum working set size. As illustrated, AWSA adjusts the working set size every two CPU QUANTUM ticks or after AWSTIME periods A1, A2, etc. The actual working set size is incremented by WSINC and decremented by WSDEC. In FIG. 2, WSINC is equal to 7 pages and WSDEC is equal to 3 pages.

Generally, it is very difficult to determine the precise size of the working set best suited for a given process since it varies depending on what operations a process is performing and varies as these operations move from phase to phase in their functioning. VMS monitors the faulting behavior of each process and adjusts WSLIMIT based on that behavior. However, AWSA does not react to the severity of current memory load (i.e. become more lenient as the load lightens) except for very large working sets. In addition, since AWSA is a statistical algorithm (i.e., it is based on statistics about what has happened), it is a reactive algorithm which assumes that what will happen is much like what has happened. This is not always the case.

AWSA is guided by the metric values assigned to several systems generation (SYSGEN) parameters. When a user logs on and, for example, activates a program, the user's working set is loaded from the image file with that program and the required data. If the program demands that more memory be made available by faulting in excess of the value of the SYSGEN parameter Page Fault Rate High (PFRATH), VMS will provide more pages of memory as determined by the SYSGEN parameter Working Set Increment (WSINC). When the memory requirements have been fulfilled, the program will eventually fault less than Page Fault Rate Low (PFRATL). VMS will remove memory pages as determined by Working Set Decrement (WSDEC). As FIG. 2 shows, the operation is a function of two time units: QUANTUM, the unit of CPU time allocated to each user and AWSTIME an integral number of QUANTUM ticks. AWSTIME determines how often the system is examined for possible memory adjustments.

Valid pages (i.e., these pages belonging to one or more processes) not currently in any working set are stored in one of five places: (1) EXE disk files; (2) system page files; (3) user disk files; (4) the Modified Page List; and (5) the Free Page List. The Modified Page List and the Free Page List are known collectively as secondary cache.

The Modified Page List is allowed to get no larger than the parameter MPW_HILIMIT. When it reaches this size, SWAPPER is activated and, with reference to FIG. 1, writes pages from Modified Page List 30 to page file 40 or mapped section file 45 until the Modified Page List has been reduced to the size MPW_LOLIMIT. After SWAPPER writes these pages from Modified Page List 30, they are logically inserted into Free Page List 25. Free Page List 25 has no maximum size. Free Page List 25 always represents all pages not currently utilized for another purpose. The terminology "free" is a misnomer—most pages in this list have valid, useful contents. They are "free" in the sense that, since they have a valid backing store, they can be used for another purpose without concern about saving their current contents. When physical memory is needed for any purpose, the page at the bottom of Free Page List 25 (which either currently has no valid contents or is the one placed in the list the longest time ago) will be selected for the new use.

When the user's program page faults, the needed page is located and steps are taken to place the page into the working set. These actions differ depending on where the needed page is located. If the page is in Secondary Cache, the system pointer table entries are modified to remove the page from the Modified Page List or Free Page List and include it in the working set. If the page is in another working set (shareable pages), the pointer table entries are updated to indicate that the page is in more than one working set. If the needed page has not previously been referenced, is zero, or has undefined initial contents, the page at the bottom of the Free Page List is zeroed and added to the working set. This is called a demand zero fault. The above three types of page faults are soft faults.

If the needed page is in a system page file or a mapped section file (writable pages which have been removed from Secondary Cache as described above), the page is read into the working set. If the needed page is in an EXE disk file, the page is also read into the working set. The above two faults are hard faults.

When a page I/O operation is performed, more than one page is read or written at a time if possible. This technique is known as clustering. Up to MPW_WRTCLUSTER pages can be written in a single I/O operation if contiguous space is available in the page file. Pages are subordered by virtual address contiguity. Up to PFCDEFAULT pages may be read at one time, but no more than are virtually contiguous and physically contiguous on the disk. When reads are done from the page file, clusters of more than a few pages are seldom achieved.

The use of memory by VMS will grow as demanded—AWSA expands working sets as needed. System pointer tables or "memory maps" which permit a process to move through the memory expand as needed. New processes are allocated memory for working sets when needed. The Modified Page List expands to its upper limit.

However, physical memory is finite. If too much memory is used, SWAPPER is implemented to free memory. Anytime the number of pages in the Free Page List drops below the number determined by the system parameter FREELIM, SWAPPER will activate and initiate various actions to free memory. Specifically, it will expand the Free Page List to the size FREEGOAL. First SWAPPER will trim the Modified Page List. Next, SWAPPER will reduce any working set which has been expanded beyond WSQUOTA back to WSQUOTA. WSQUOTA is the smallest guaranteed working set size a process may have. SWAPPER will then swap or trim inactive processes. Finally, SWAPPER will swap or trim active processes. Swapping and trimming will be explained below. Most VMS systems have many inactive processes at any given time and large amounts of memory can be freed up by effective swapping. However, the swapping or trimming of active processes is never desirable.

Swapping is the action whereby the entire process working set is written, as a whole, to disk. It is accomplished by several large I/O operations directly from the working set to the swap file. A swapped process is not returned to memory until it is reactivated, even if memory becomes abundantly available. The overhead involved in swapping is relatively small, so long as the process remains in the swap file for several minutes or more. Pages freed by swapping are placed at the end of the Free Page List.

Trimming reduces the size of the working set to some predetermined size (SWPOUTPGCNT). Trimming inactive processes generates severe performance degradation for the system. The trimmed pages go to the top of the Secondary Cache, which tends to push pages from the active working sets out of the cache. Therefore, hard faulting among active processes is significantly increased. As the trimmed process continues to be inactive, most of its pages cycle out of the Secondary Cache. The extra volume of pages in the system page file tends to increase its fragmentation, potentially decreasing SWAPPER's ability to create large page clusters when writing pages. When the trimmed process is reactivated, since up to 90% or more of its working set will have been removed, it will fault heavily. Many of these faults will be hard faults. Because clustering from the system page file will be poor, many more I/O operations will be required to restore the process working set than if the process had been transferred to a swapfile. Although an inswap from the swap file is a hard fault, it is a less resource intensive operation since it generally requires few I/O operations.

If the number of pages in the Free Page List exceeds a predetermined value (BORROWLIM) (suggesting very low demand for memory), AWSA expands working sets to WSEXTENT, the largest working set size allowed per process. In DEC terminology, this is known as "borrowing". Two safety mechanisms exist to prevent borrowing from overusing memory. First, the actual expansion of the working set, as opposed to the simple changing of WSLIMIT, to any amount larger than WSQUOTA is inhibited if there are less than a predetermined number (GROWLIM) of pages in the Free Page List. Second, SWAPPER reduces working sets larger than WSQUOTA back to WSQUOTA any time the Free Page List size drops below FREELIM.

Normally, VMS handles page movements very well. The drawback of VMS stems from the fact that the system manager can only tune the metric value of these SYSGEN parameters to meet a static system load. Problems arise in very busy interactive systems when the demand for memory overwhelms the VMS AWSA function. The symptoms of this problem include slow interactive response time, slow log-ins, slow image activations and often, an unacceptable cap on the number of interactive users. When these conditions occur, the system manager has few options. He can retune the system to meet these demand periods or he can inhibit certain user's access to the system. In most government and commercial enterprises, neither of these alternatives are viable.

FIG. 3 is a schematic diagram which illustrates these effects. Region 12 represents the narrow range of system load for which the system manager has statically tuned the system for efficient operation. Load as used herein refers to the collective of interactive and batch users, anticipated CPU and I/O usage, and memory demand and utilization of external devices such as printers and plotters. However, as curve 14 suggests, system load conditions do not always fall within the range of system loads for which the system has been statically tuned. At point A, for example, the system load is heavier than the statically tuned load and the system suffers from slow interactive response times, slow log-ins etc. At point B, the system load is within the range of tuned loads and the system operates efficiently. However, at point C the system load is less than the statically tuned load and the system capabilities are underutilized. The present invention is a method of load sensitive reactive tuning which seeks to configure region 12 to the varying load represented by curve 14 by periodic readjustment of certain tuning parameters.

SUMMARY OF THE INVENTION

Accordingly, it is an object of the present invention to tune the VMS Memory Management System making it more responsive during times of heavy interactive use.

It is another object of the present invention to monitor demand for memory resources and dynamically alter the metric value of SYSGEN parameters associated with the AWSA function.

It is yet another object of the present invention to provide a method for scheduling processes in response to system load and in concert with the memory management allocations.

The present invention provides a method of periodically adjusting a multi-user computer system for efficient operation. The multi-user computer system includes a central processing unit which allocates units of processor time among a plurality of processes and a physical memory comprising a plurality of pages. The computer system is subjected to varying system loads based on the number of processes currently being handled by the central processing unit. Each user of the computer system is initially allocated a predetermined number of pages of physical memory. Heuristic observations are periodically performed to generate information indicative of the system load. The number of pages of physical memory allocated to a given user and the size of the units of processor time are adjusted in response to the periodic heuristic observations.

The present invention also provides a method of assigning priority to each of a plurality of processes in a computer system in which units of processor time are allocated among a plurality of processes on the basis of the position of a process in a queue. The queue is arranged in accordance with the priority associated with each process. A first priority is assigned to a given process which requires at least one unit of processor time. The first priority positions the process in the queue such that the process is allocated a unit of processor time after a first portion of the remaining processes. The process is maintained at the first priority until the process receives a predetermined number of units of processor time. A second priority is then assigned to the process. The second priority positions the process in the queue such that the process is allocated a unit of the processor time after a second portion of the remaining processes. The second portion generally contains more processes than the first.

The method of the present invention is designed to favor the interactive user over the batch user. Each interactive user has an associated "person cost". It is desirable to ensure that these interactive users are allocated sufficient memory and CPU time to eliminate idle, unproductive time and thereby reduce these person costs.

The method of the present invention uses heuristic observations and feedback loops to optimize system parameters and user response. In systems that have limited memory resources, throughput increases of 100% and more have been generated utilizing the method of present invention. Response time in some applications has been reduced by a factor of ten. Image activation times may also be reduced. Even systems having excess memory and which have been tuned to DEC's recommended settings can realize throughput increases of up to 18%.

The method of the present invention enables VMS to maximize utilization of available system memory. Memory usage is controlled on a per-process basis as well as on a system-wide basis. Further, the method of the present invention includes a program which incorporates an algorithm which may be so efficiently coded that only a few seconds of CPU time per day are required to implement the method on a typical VAX system. The coded algorithm typically uses fewer than 100 pages of memory. Accordingly, overall system performance is dramatically enhanced by implementation of this method.

BRIEF DESCRIPTION OF THE DRAWINGS

A more complete appreciation of the present invention and many of the attendant advantages thereof will be readily obtained as the invention becomes better understood through the following detailed description with reference to the accompanying drawings.

DESCRIPTION OF THE PREFERRED EMBODIMENT

The preferred embodiment of the present invention is directed to a load sensitive reactive tuning method for significantly accelerating system operation by periodically adjusting the SYSGEN parameters and some per-process parameters of a VAX/VMS system in response to current system load. Although a VAX/VMS system can be statically well-tuned for a particular program mix, it is impassible to statically tune a VAX/VMS system for the wide variations of load and memory requirements encountered on a typical system in a typical time sharing environment.

The per-process parameters noted above refer to working set parameters. The per-process parameters include WSDEFault, WSQUOTA, WSEXTent, and PFCDEFAULT. These parameters are preferably set as described below. WSDEF, the working set size which a process is allocated when whatever operation the user is performing is completed (image exits), is set to 600 pages. WSQUOTA, the smallest, guaranteed working set size a process may have, is set to 350 pages. WSEXT, the largest working set size permitted per process, is set to 1000 pages when FREELIST is less than BORROWLIM and up to 2000 pages when FREELIST is greater than BORROWLIM. WSEXT is set to the smallest of WSMAX (SYSGEN parameter set by the system manager), PAGE FILE QUOTA/2, or MAX_EXTENT=10,000. The present invention preferably stops increasing WSEXT when the Page File fills up. PFCDEFAULT, the number of blocks moved in a page fault, can vary between 64 and 96. It should be noted that although these are the preferred values for a VAX/VMS system, the present invention is not limited in this respect.

The invention described herein was developed for use on the Digital Equipment Corporation VAX series of computers. The VAX series utilizes the VMS operating system. Although references are made to VMS-specific commands, system parameters, and privileges, the method of the present invention may be utilized with any virtual memory machine, specifically, IBM systems utilizing the VM operating system or other virtual operating systems employed by Data General and other vendors. The key to the invention is controlling the memory management function in a manner reactive to system load. In all virtual memory systems, the virtual memory is controlled by moving data from physical memory to areas analogous to the VMS page and swap files.

Figure 1:
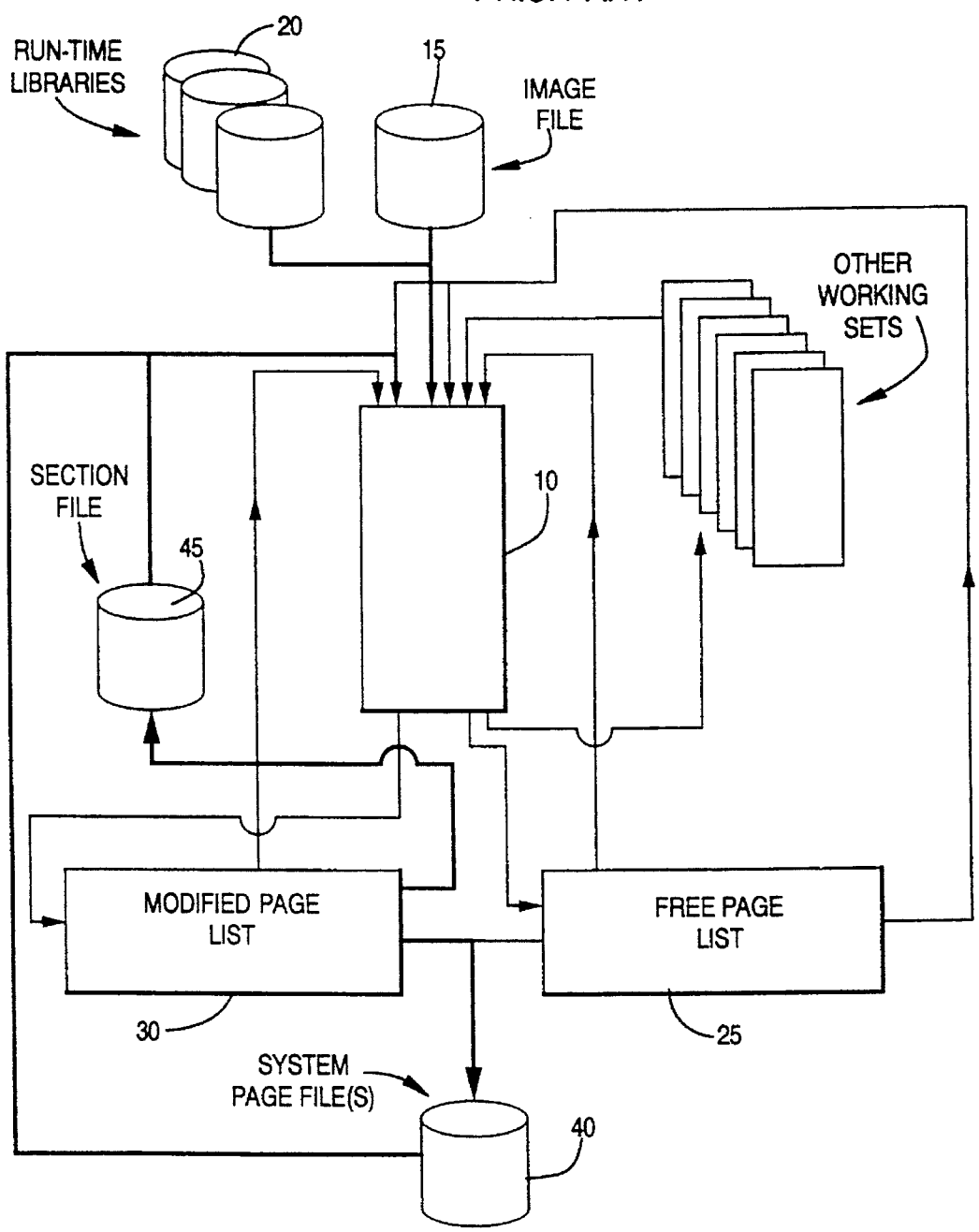
FIG. 1 is a diagram of page movements in memory with the VAX/VMS operating system.
Figure 2:
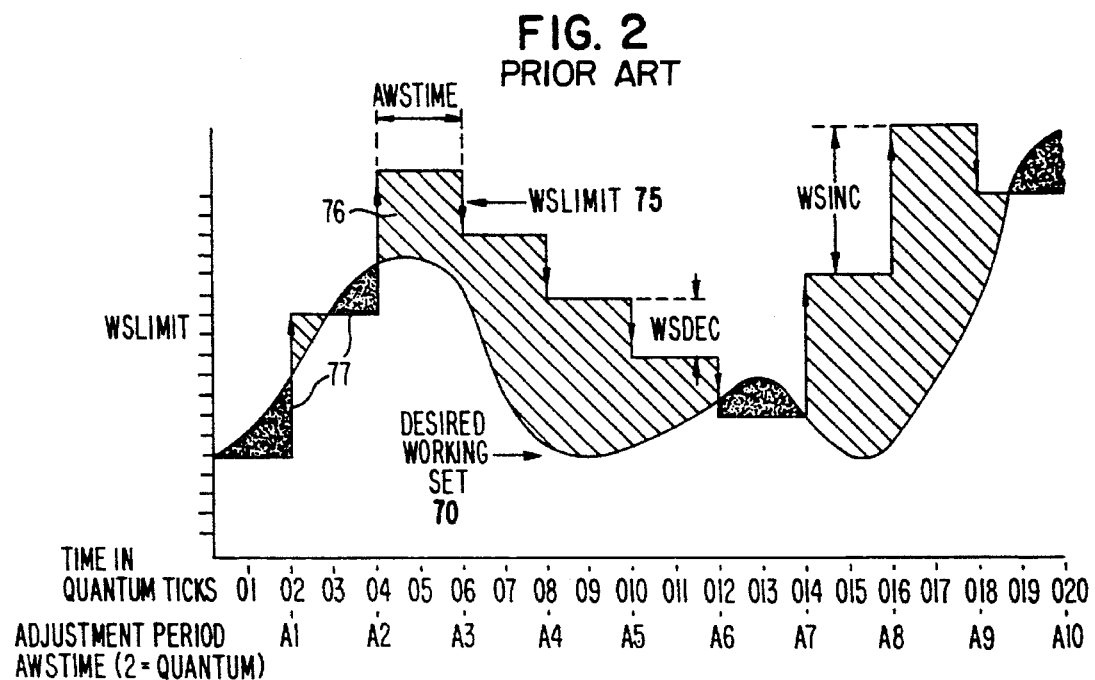
FIG. 2 is a graphical illustration of the Automatic Working Set Adjustment (AWSA) function in VMS.
Figure 3:
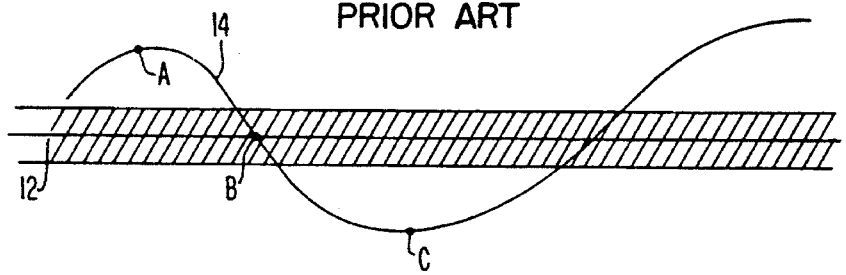
FIG. 3 is a schematic comparison of the varying system load and the load for which the system has been statically tuned.
Figure 4:
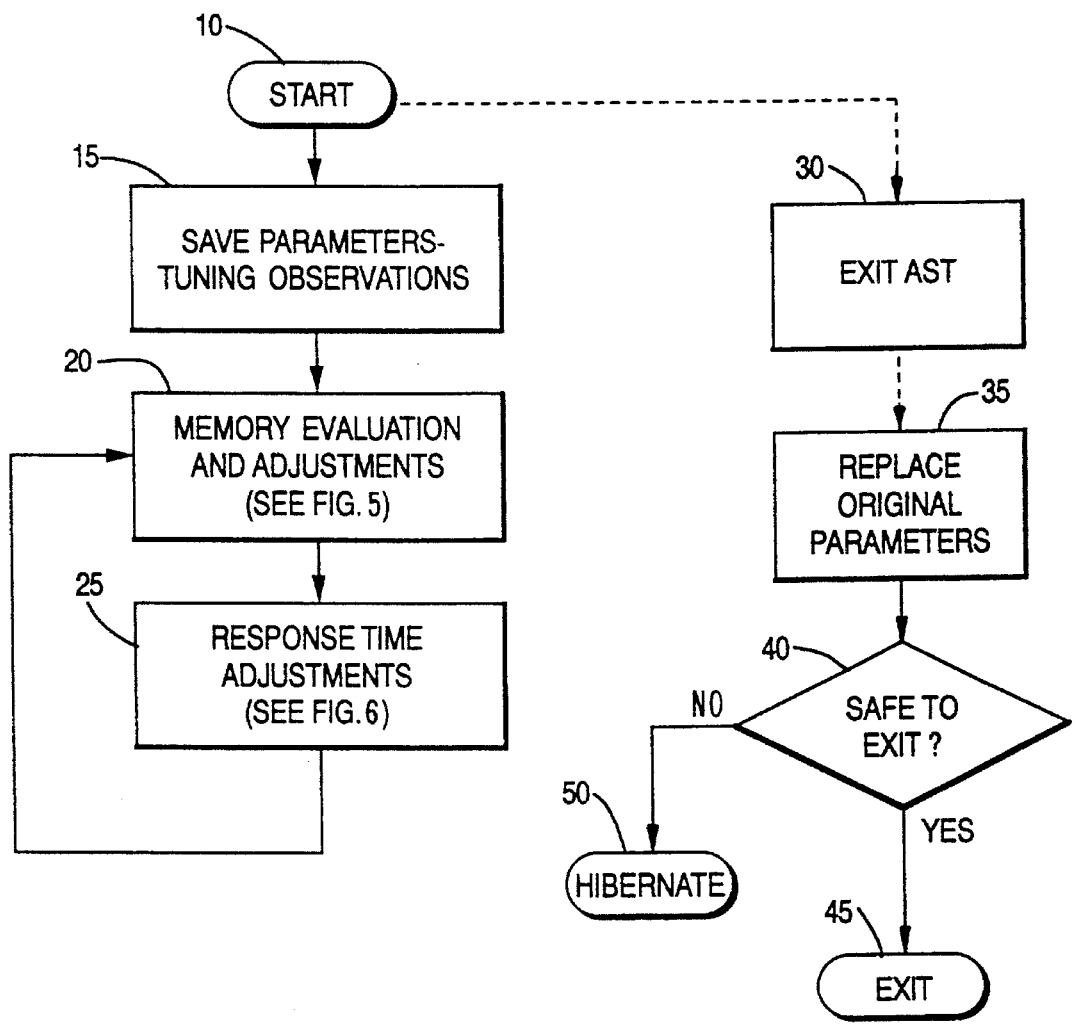
FIG. 4 is a generalized block diagram of the present invention.

FIG. 4 is a flow diagram illustrating the general method of the present invention upon its initialization on a VAX CPU. After activation at step 10, the program passes to step 15 where the current values of all dynamic SYSGEN parameters which may subsequently be altered are saved. This operation is performed so that, if and when the program is terminated, the system may be returned to its pre-existing state. (VAX/VMS systems also include non-dynamic SYSGEN parameters. Several adjustments are preferably made to these non-dynamic parameters in order to maximize the benefits of the present invention. These adjustments will be detailed below.)

Also, at step 15, periodic heuristic system load observations are made. Heuristic as used herein refers to exploratory solving techniques which utilize self-education (such as feedback) to improve performance. These techniques are the elemental building blocks of artificial intelligence applications. The heuristic observations are designed to generate a self-education process for the system. The system reacts based on what it is learning such that the adjustments described below are based not only on the latest observations but on a history or series of observations. Heuristic observations are typically made of the NULL process (a psuedo-process utilizing all CPU time not used by users or processes); the number of processes in "compute" state i.e., the number of processes "getting things done"; which processes are in compute state; and the various fault ratios (discussed below). The purpose of these observations is to obtain a snapshot of the current system load. However, as detailed below, these snapshots are not viewed by the system in isolation, but rather as a part of a learning process based on a history of such observations. Observations are made at regular intervals, preferably every two seconds. The time interval between observations is generally fixed to ensure that it is of sufficient duration to obtain observations which have some degree of validity in generating information related to system load. It has been determined that in two seconds, enough activity has occurred to generate sufficient information to effectively adjust the parameters discussed below. In short, observations should be made often enough to provide an accurate picture of the interactive system load and to permit reaction in a timely manner.

The system load observations are weighted using an exponential smoothing function. Exponential smoothing functions such as Gaussians and super-Gaussians are well known and are utilized herein to smooth the observations in order to eliminate the effect of anomolies e.g., all users hitting the enter or return key at the same time, an usually large amount of NULL time, etc. The exponential smoothing ensures a gradual adjustment of the system rather than rapid adjustments based on the latest, potentially anomolous, observations. The adjustments are not based on the latest "snapshot" of system load, but rather are based on a series or history of snapshots. In order to generate gradual adjustment, the past system history embodied in this series of snapshots is weighted more heavily by the smoothing function than the latest snapshot.

After several snapshots, a memory evaluation is performed at step 20. The memory evaluation of the present invention generates the optimum Free Page List size, eliminates hard faulting to the extent possible, and keeps swapping to a minimum.

After the memory evaluation of step 20, response time adjustments are performed at step 25. The response time adjustments ensure that active users utilizing memory are provided with sufficient CPU time to execute their program.

The program next returns to step 20 and continuously loops through steps 20 and 25 periodically readjusting the SYSGEN parameters in response to the system load observations discussed above. The program may be exited at any time during its operation as schematically indicated at step 30. At step 35, the SYSGEN and per-process parameters are returned to the values previously stored at step 15. This returns the computer system to the state it was in prior to implementation of the program. A small amount of time may be required to restore all of the per-process parameters if some processes are swapped out. At step 40, a determination is made whether it is safe to exit the program, i.e, whether the system returned to the state it was in prior to activation of the program. If so, the program passes to step 45 and the program is exited. If not, the program passes to step 50 and goes into a hibernation state. Hibernation refers to a state in which a process does not utilize CPU time or does not wait for an event flag to free itself.

The overall system operation has been described with respect to FIG. 4. The memory evaluation and adjustments of step 20 will be described below with reference to FIG. 5. The response time adjustments of step 25 will be discussed with reference to FIG. 6.

Figure 5:
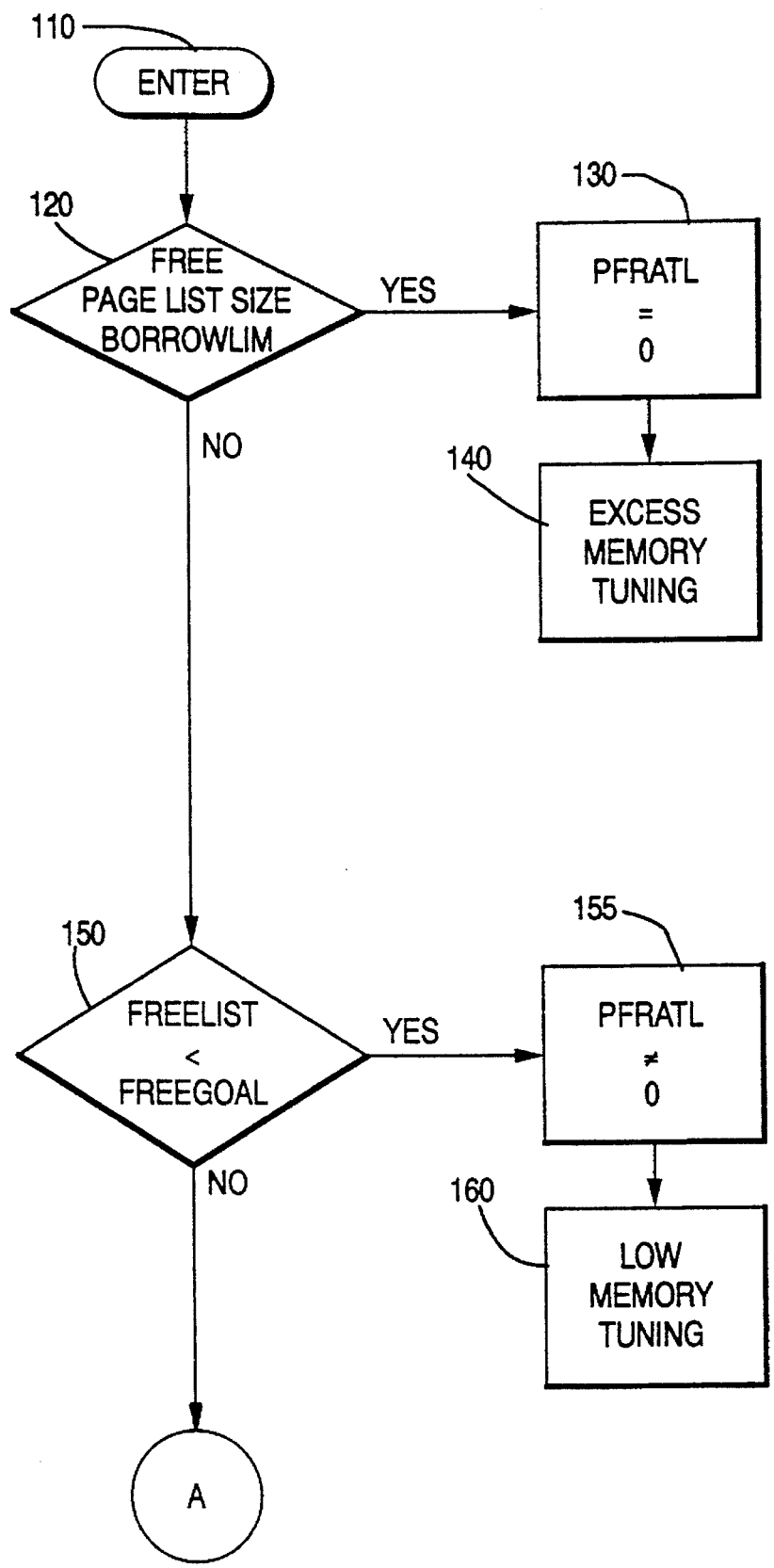
FIGS. 5–9 are block diagrams of the specific functions of the present invention.

FIG. 5 illustrates the memory evaluation of step 20 in greater detail beginning with entry at step 110. A determination is made at step 120 whether the Free Page List size, FREELIST, is greater than BORROWLIM. As noted above, BORROWLIM represents the Free Page List size necessary to permit processes to expand past WSQUOTA. WSQUOTA represents the smallest guaranteed working set size a process may have. If the test is positive, i.e., FREELIST is greater than BORROWLIM, the Page Fault Rate Low PFRATL is set equal to 0 at step 130 and excess memory tuning is performed at step 140. Excess memory tuning will be described in detail below.

If the test at step 120 is negative, i.e. FREELIST is less than BORROWLIM, control passes to step 150 and a determination is made whether FREELIST is less than FREEGOAL. FREEGOAL represents the target length of the Free Page List. If FREELIST is less than FREEGOAL, PFRATL is set to a value typically between 1 and 10 at step 155 and the system is tuned for low memory at step 160. PFRATL should generally be around 1 and should seldom approach 10. Low memory tuning will be described in greater detail below. If FREELIST is not less than FREE-GOAL, control passes to program step 405 shown in FIG. 6. Thus if FREELIST is greater than FREEGOAL, but less than BORROWLIM, the physical memory is allocated efficiently among the processes and no adjustments thereto are necessary.

Figure 6:
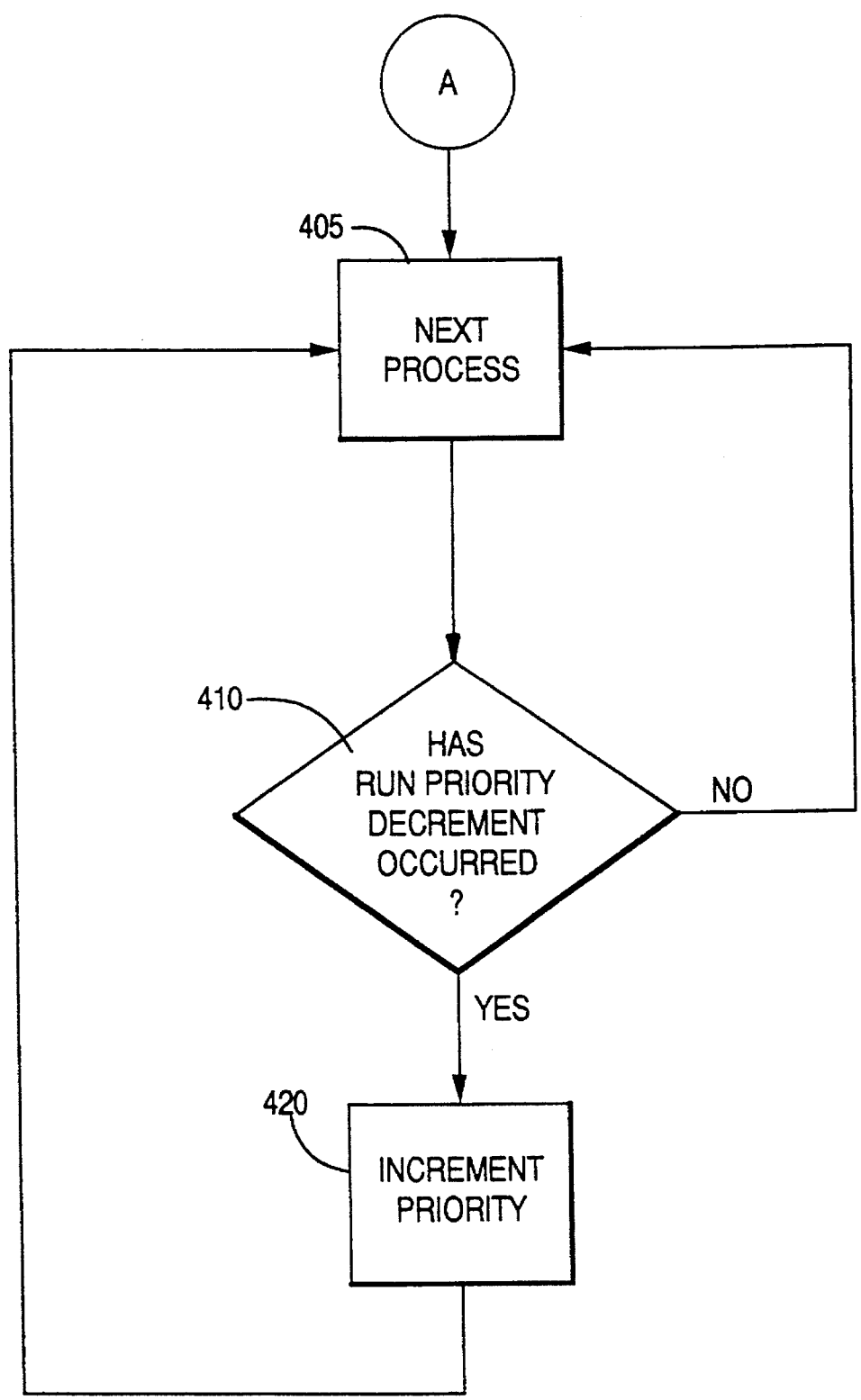

FIG. 6 illustrates the response time adjustments made concurrently with the memory adjustments. While the goal of memory tuning is to efficiently allocate memory resources to users that need it and remove memory resources from those who do not, response time adjustments ensure that those users who are active and using memory also get adequate CPU time to execute their jobs.

Response time adjustment is a loop that runs on in-swapped processes only. Response time adjustments are related to the concept of system priority. Priority may refer to base priority allocated to the system users or run priority which is internal to the system and is generated when a program is activated. Priority essentially determines the order in which users and the programs they run are provided access to the central processing unit. VMS offers priorities ranging from 0 to 31. Under VMS, a normal interactive user has a base priority of 4. System services and special utilities generally run at priority 16 or above. When the user runs a program, priority is initially elevated or boosted. However, this boosted run priority is decremented (decays) at the end of each QUANTUM in VMS. In very simplistic terms, a program is placed in line or on a queue by the system scheduled on the basis of its priority and waits for its QUANTUM tick of CPU time. After receiving its tick, the program is placed back in line at a position determined by its decremented run priority. As the program's run priority is decremented, it enters the line further and further back behind processes having a higher priority and must wait longer and longer to receive its next QUANTUM. The present invention serves to limit or soften the rate of the priority boost decay on interactive processes. (Decay time is not softened on batch jobs.)

As FIG. 6 shows, a determination is made at step 410 whether a run priority decrement has been generated by VMS. If not, control passes to step 405 and the next process is examined. If a run priority decrement has been generated, the run priority is increased at step 420 and control again passes to step 405. The goal is to keep the run priority above the base priority. For example, if QUANTUM has been lowered to 1/50 of a second, the above-described technique will fulfill the requirements of processes requiring many CPU cycles and will eliminate long CPU queues of processes that may need less than 1/50 of a second of CPU. The net result is faster terminal response time.

Figure 7:
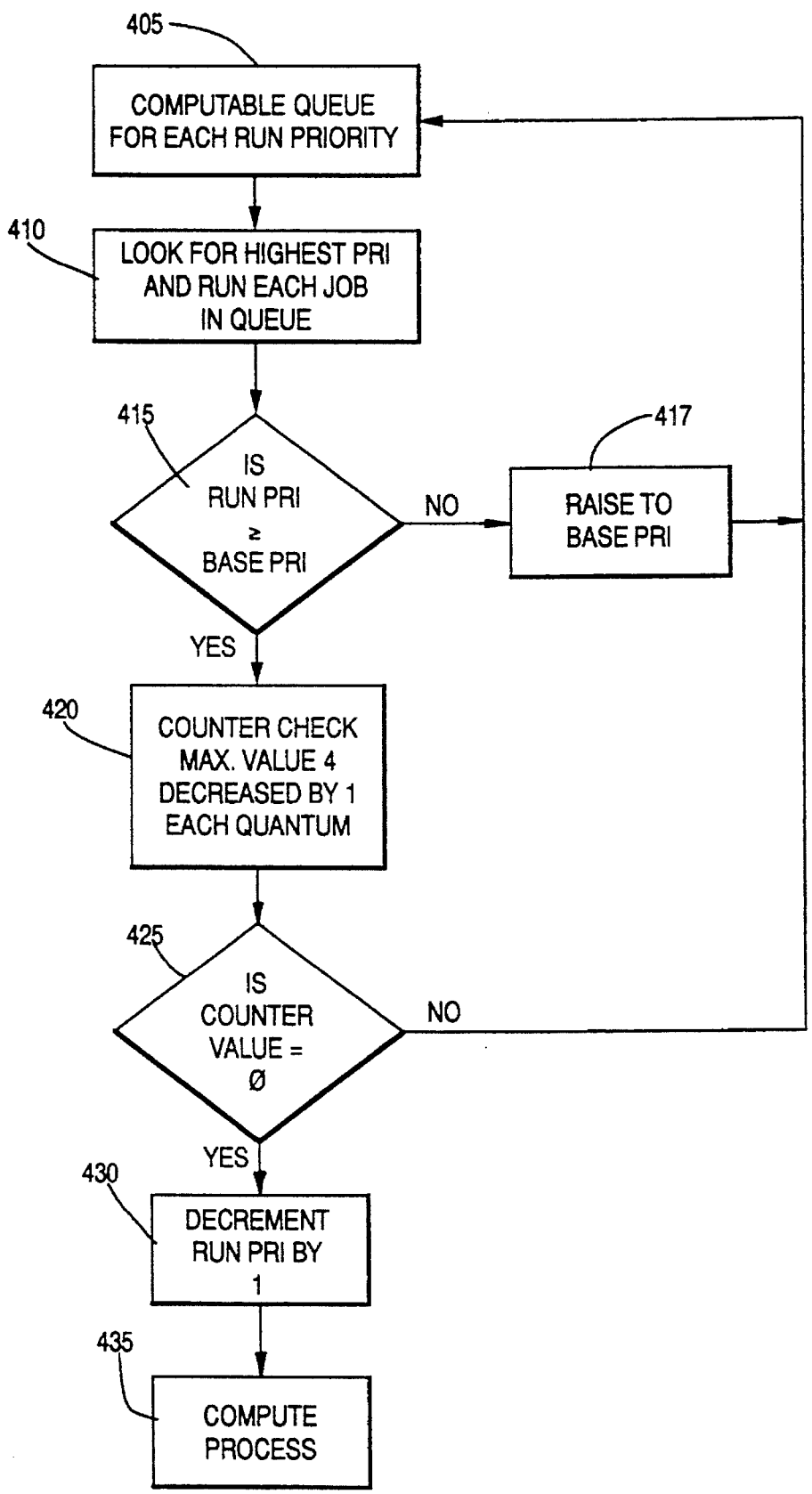

This technique is illustrated in more detail in FIG. 7. At step 405, a computable queue is generated for each run priority. At step 410, the highest priority is determined and each process in the queue receives a QUANTUM tick of CPU time. At step 415, the run priority is compared with the base priority. If the run priority is less than the base priority, it is raised to the base priority at step 417 and control returns to step 405. If the run priority is greater than the base priority, control passes to step 420 and a counter having a maximum value of 4 is decreased by 1 for each QUANTUM tick. The program then passes to step 425 where a determination is made whether the counter value is equal to 0. If not, control returns to step 405. If so, the run priority of the process is decremented by 1 at step 430. The process is computed at step 435. If a job had a run priority of 8, for example, it would receive four QUANTUM ticks of CPU time before being decremented to a run priority of 7. Thus, a higher priority is assigned to an interactive user on a repetitive basis.

Figure 8:
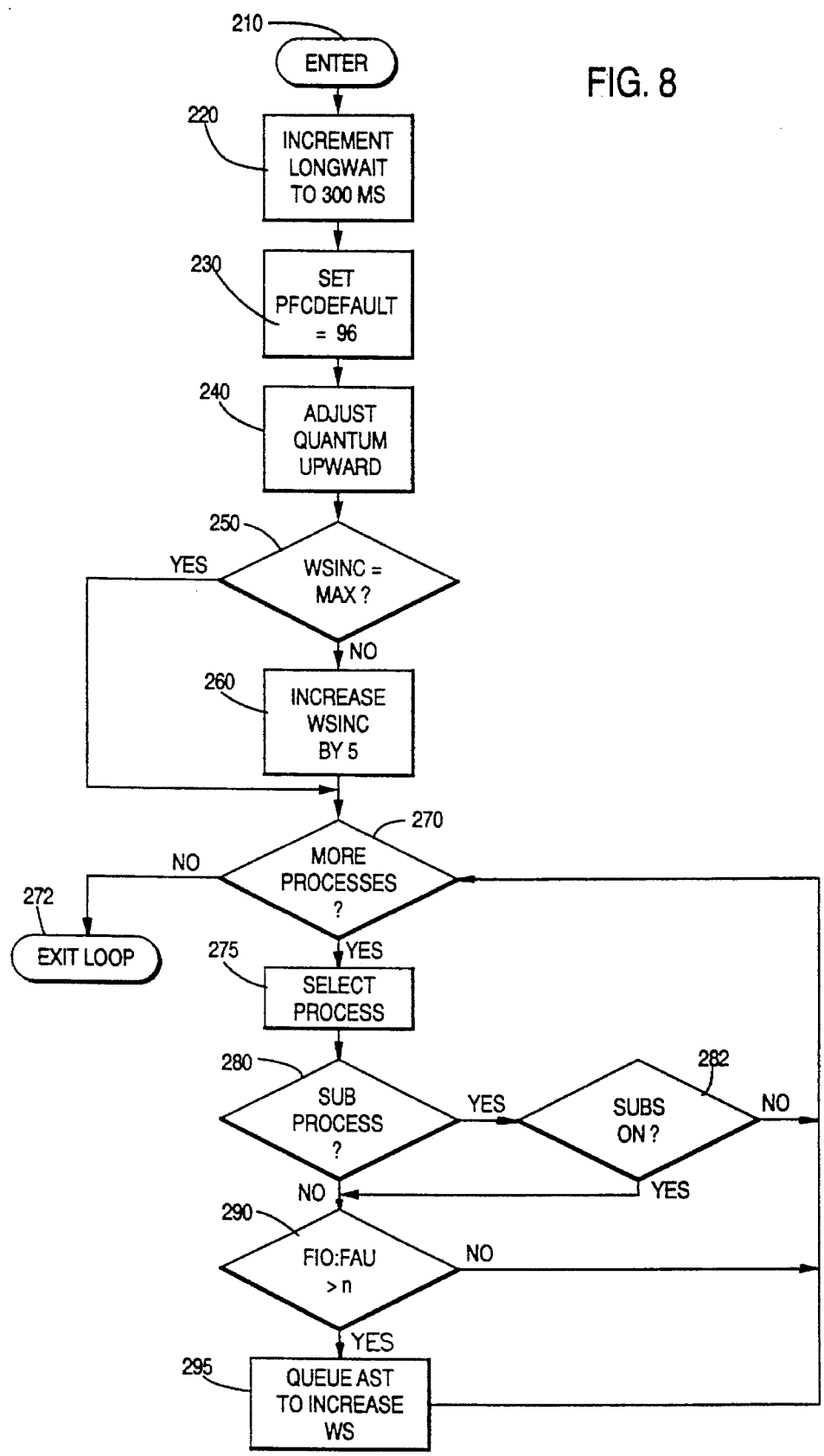

FIG. 8 illustrates the excess memory tuning operation of step 140 in greater detail with entry at step 210. Initially, three SYSGEN parameters are altered. LONGWAIT is increased to 300 milliseconds at step 220. LONGWAIT is the amount of time a process can be dormant in memory before it is a candidate for swapping. At step 230, PFCDE-FAULT is set to 96. PFCDEFAULT is the page default cluster size for moving pages of memory to an I/O device. At step 240, QUANTUM is increased by a smoothing factor. Thus, if few interactive processes are present and memory is available, the size of the QUANTUM ticks is adjusted upward. The adjustment is based on the smoothed heuristic observations as described above. Thus, even though at the last observation there may have been a large amount of NULL time and few processes in a compute state, tending to indicate the availability of CPU time, the observation is given an appropriate weight by the smoothing function in order to ensure QUANTUM is adjusted gradually, and is not adjusted solely on the basis of the latest observation. It should be understood that the values of the SYSGEN parameters listed above represent a presently preferred embodiment and the invention is not limited in this respect. It will be apparent to those of ordinary skill that other values may be utilized.

A determination is made at step 250 whether the working set has reached its maximum size (WSMAX). If not, WSINC is increased by 5 pages at step 260 and control passes to step 270 where a check is made to see if there are additional processes to be tested. The loop continues as long as users (processes) are using the machine.

If at step 250, it is determined that WSMAX has been reached, control immediately passes to step 270. If at step 270, there are no additional processes, the invention will exit the loop and enter a "hibernate" state at step 272. If more processes are present, however, a process is selected for testing at step 275. This process is examined for subprocesses at step 280. A subprocess is spawned from the parent or owner process and its resource consumption accrues to the parent. For example, a programmer may be writing code on the terminal and want to get his electronic mail. The programmer could spawn a subprocess without the need to logout and login again. If subprocesses are present, a determination is made at step 282 whether the subprocesses are on. If so, control passes to step 290. If not, control returns to step 270. If, at step 280, no subprocesses are present, control passes immediately to step 290. At step 290, the ratio of hard faults (FIO) to total faults (FAU) is compared to a predetermined value n, where n is related to processor speed.

Again, these heuristic observations of fault values are appropriately smoothed to ensure gradual adjustment. If this ratio is greater than n, the program will queue an asynchronous system trap (AST) interrupt at step 295 to increase the working set by the value of WSINC. This loop continues as long as there are active processes.

A process allocated adequate memory as described above will perform more "less expensive" soft faults and fewer hard faults (FIOs). This is the primary resource savings. By maintaining the optimum working set size per process, the "proper" sized FREELIST may be maintained and all users have a reasonable chance at efficient memory utilization.

Figure 9:
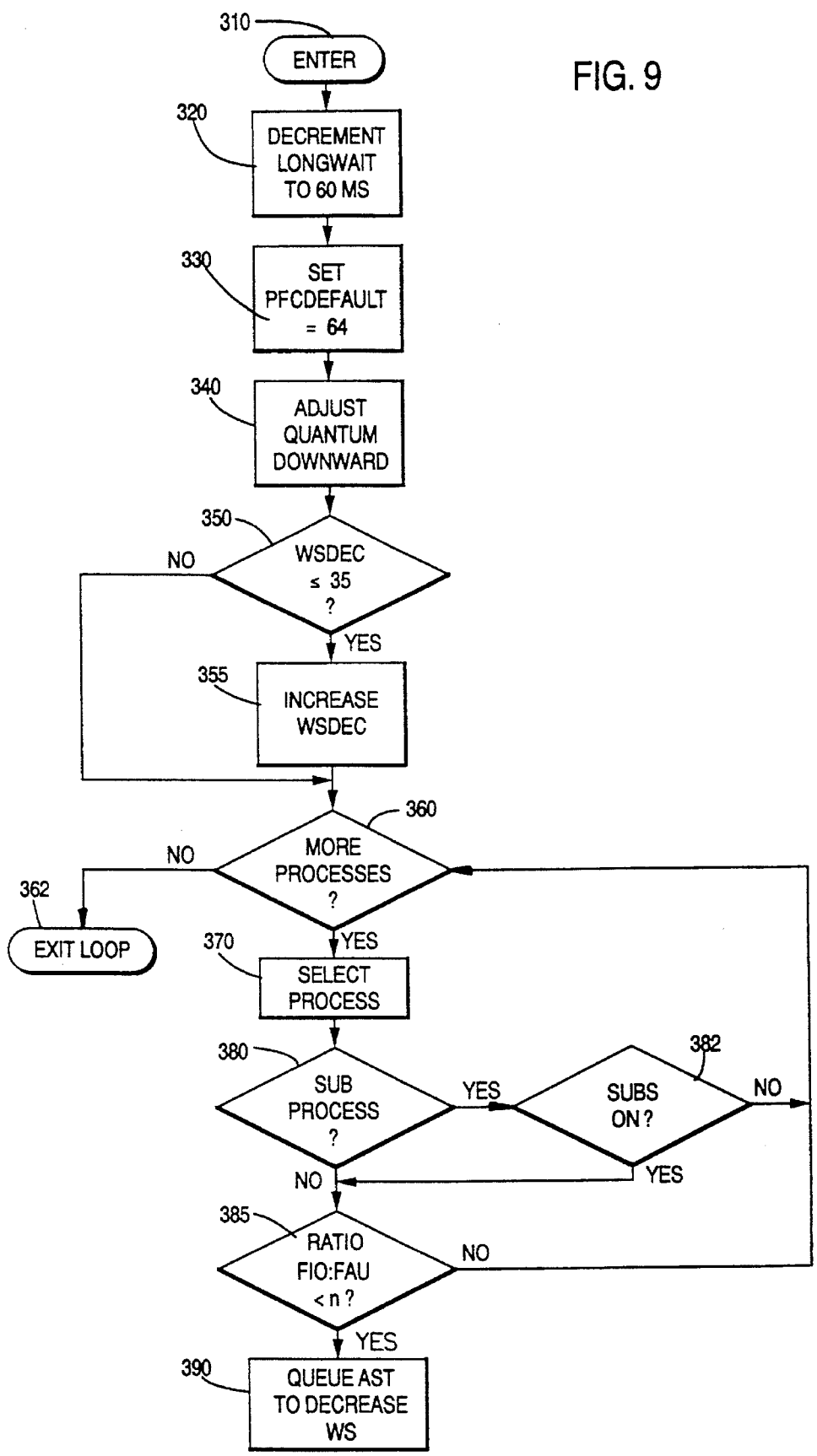

FIG. 9 illustrates the low memory tuning operation of step 160 with entry at step 310. Initially, three SYSGEN parameters are altered. LONGWAIT is decreased to 60 milliseconds at step 320, PFCDEFAULT is set to 64 at step 330 and QUANTUM is adjusted downward by a smoothing factor at step 340. Again, QUANTUM is adjusted on the basis of the smoothed heuristic observations discussed above. These numbers are illustrative of a presently preferred embodiment and the invention is not limited thereto. Next, a determination is made at step 350 whether the value of Working Set Decrement (WSDEC) is less than or equal to 35. If so, control passes to step 355 and WSDEC is increased. WSDEC is generally maintained at a value of 26 pages. The maximum value of WSDEC is 37 pages while the minimum value is 11 pages. Increments and decrements of WSDEC are generally 2 pages. Control then passes to step 360 where a determination is made whether there are additional processes. If, at step 350, WSDEC is greater than 35, control immediately passes to step 360.

If at step 360, it is determined that there are no additional processes, control passes to step 362 and the program hibernates. If additional processes are present, control passes to step 370 where a process is selected for testing. At step 380, a determination is made whether the selected process has any subprocesses. If so, control passes to step 382 where a determination is made whether the subprocesses are active. If not, control returns to step 360. If so, control passes to step 385. Control immediately passes to step 385 if no subprocesses are detected at step 380. A determination is made at step 385 whether the ratio of hard faults (FIO) to total faults (FAU) is leas than a predetermined number n, where n is a number determined by processor speed. These fault rates are determined on the basis of the smoothed observations as discussed above. If so, control passes to step 390 and an AST is queued to decrement the working set by the value of WSDEC. This loop continues as long as there are active processes.

The invention further includes a dynamic screen generating monitor which permits the system manager to view the current system load and various tuning parameters on a continuous basis. The system monitor allows the system manager to view the parameters and statistics that affect system throughput and response time. The system monitor preferably displays both the initial and current values of the following SYSGEN parameters: PFRATL, PFRATH, WSINC, WSDEC, AWSTIM, PFCDEFAULT, LONGWAIT. The system monitor may highlight the differences between the initial and current values of these parameters so the system manager may analyze the effect of the present invention on system operation. The system monitor may also display the current values of other parameters such as FREELIM, FREEGOAL, GROWLIM, BORROWLIM, MPW_HILIMIT, and MPW_LOLIMIT.

In addition, the system monitor preferably displays both current and average system statistics including Free List size, Modified Page List size, number of processes, number of processes swapped out, swaps per second, total page faults per second, number of page fault reads per second, number of page fault writes per second, percentage of swapper time, and percentage of null time.

The system monitor screen display is generally divided into an upper and lower display. The upper display displays the system parameters described above and the lower display displays the system statistics also described above. Each display is preferably generated as a set of bar graphs. The bottom line of the system monitor display screen may be used to display suggestions to enhance system tuning based on the current system parameters and statistics.

In order to implement the present invention on a VAX/VMS system, several hardware requirements must be met. The VAX processor must have at least 2 megabytes of main memory and at least 300 pages of disk space for installation of the program implementing the method of the present invention. (However, the permanent space requirements for the program are less than 100 pages of disk space.) The present invention may also increase swap space requirements. Therefore, swap file space equal to at least 1200 pages per process must be resident on the system at a given time. If the swap file space requirement is not fulfilled, VMS will allocate swap file space from the page file. If the page file is not large enough to permit sufficient allocation of swap file space, the system may become deadlocked.

As noted previously, several non-dynamic SYSGEN parameters should be set to predetermined values in order to maximize the efficiency of the present invention on a VAX system. MPW_WRTCLUSTER, the maximum number of pages which can be written in a single I/O operation, should be set equal to 120. MPW_WAITLIMIT should set equal to 16,384. Under no circumstances should MPW_WAITLIMIT be less than MPW_HILIMIT, the maximum size of the Modified Page List. If this occurs, the system will eventually deadlock. MPW_HILIMIT is set in accordance with the amount of system memory. For systems having less than 3 megabytes of memory, the parameter should be set to 600. If there are more than megabytes of memory, MPW_HILIMIT should be set to 1,000. If the system has more than 8 megabytes of memory, MPW_HILIMIT should be set to 1,500. MPW_LOLIMIT, the minimum size of the Modified Page List, should be set equal to MPW_HILIMIT multiplied by 0.8, but not set to more than MPW_HILIMIT minus 120. For example, if MPW_HILIMIT equals 600, MPW_LOLIMIT should be set to 480. MPW_HILIMIT is equal to 1,000, MPW_LOLIMIT should be set equal to 800. If MPW_HILIMIT is equal to 1,500, MPW_LOLIMIT should be set equal to 1,200. BALSETCENT, the maximum number of processes, should be set high enough so that the maximum number of processes that are present is one less than BALSETCENT. However, this parameter should not be set to an overly high limit because there is a penalty associated with a high value. WSMAX should be set to at least 3,000, and preferably higher i.e. in a range of 4,000 to 6,000 in systems having more than 3 megabytes of memory.

In order to provide optimal memory allocation to the various processes on the computer system, the present invention should be able to override the values of WSDEF, WSQUO, and WSEXT set by the AUTHORIZE function in the user authorization file. AUTHORIZE is the mechanism by which users can be assigned privileges, protection levels and various limits that control resource usage by a user account. The present invention will not alter WSDEF, WSQUO, or WSEXT for any process which has AWSA turned off. The present invention will set WSQUOTA to the lower of (1) the value specified with AUTHORIZE or (2) 1,000 pages. This is why the system will require 1,200 pages of swap file space per process when the present invention is implemented. On systems with extra swap file space, WSQUOTA should be set even higher with the AUTHORIZE command.

The major benefits of the invention are: (1) more efficient use of memory by interactive users; (2) the CPU will be able to support more users than it would without the invention; (3) faster log-ins and image (program) activations; and (4) keyboard response time increases of 10–300% for interactive users.

The invention has been described in detail in connection with the preferred embodiments. These embodiments, however, are merely for example only and the invention is not limited thereto. It will be easily understood by those skilled in the art that other variations and modifications may easily be made within the scope of this invention as defined by the appended claims.

I claim:

1. A method of allocating memory among a plurality of processes of a computer system, wherein the computer system comprises a central processing unit and a physical memory comprising a predetermined total number of pages, said method comprising the steps of:

allocating to each of said plurality of processes a working set comprising pages of said physical memory;

increasing by a first number of pages or decreasing by a second number of pages the working set respectively allocated to each of said plurality of processes in accordance with a first rate at which each respective process accesses pages of said physical memory not in its working set;

periodically making heuristic observations of system load factors at predetermined intervals;

evaluating said system load factors to determine a current number of available pages of said physical memory; and adjusting the first and second numbers by which the working set allocated to each process is respectively increased or decreased in response to the evaluation of said system load factors.

2. The method according to claim 1 wherein the periodic heuristic observations are performed every two seconds.

3. The method according to claim 1 wherein the steps of increasing by a first number of pages or decreasing by a second number of pages the working set respectively allocated to a given process are based on a series of periodic heuristic observations.

4. The method according to claim 3 wherein the series of periodic heuristic observations are weighted in accordance with when each observation in the series was made, more recent observations being weighted less than less recent observations.

5. The method according to claim 4 wherein the series of periodic heuristic observations are weighted by an exponential smoothing function.

6. The method according to claim 1 wherein if the number of pages of available memory is less than a first predetermined number of pages, the working set allocated to a given process is decreased by a current second number of pages when the given process accesses pages of said physical memory not in its working set at a rate less than said first rate.

7. The method according to claim 1 wherein, if the number of pages of available memory is greater than a first predetermined number of pages, the working set allocated to a given process is increased by a current first number of pages when the given process accesses pages of said physical memory not in its working set at a rate greater than said first rate.

8. The method according to claim 1 further comprising the steps of:

adjusting an amount of time a process is under certain conditions dormant in said physical memory of said computer system before the process is under certain conditions moved out of said physical memory in accordance with the heuristic observations; and adjusting a number of pages which is under certain conditions moved from said physical memory simultaneously in accordance with the heuristic observations.

9. The method according to claim 8 wherein if the number of pages of available memory is less than a first predetermined number of pages, the working set allocated to a given process is decreased by a current second number of pages when the given process accesses pages of said physical memory not in its working set at a rate less than said first rate.

10. The method according to claim 9 further comprising the steps of:

decreasing the amount of time a process is under certain conditions dormant in the physical memory of said computer system before the process is under certain conditions moved out of the physical memory; and decreasing the number of pages which are under certain conditions moved from the physical memory simultaneously.

11. The method according to claim 8 wherein, if the number of pages of available memory is greater than a first predetermined number of pages, the working set allocated to a given process is increased by a current first number of pages when the given process accesses pages of said physical memory not in its working set at a rate greater than said first rate.

12. The method according to claim 11 further comprising the steps of:

increasing the amount of time a process is under certain conditions dormant in the physical memory of said computer system before the process is under certain conditions moved out of the physical memory; and increasing the number of pages which are under certain conditions moved from the physical memory simultaneously.

13. The method according to claim 1 wherein the first number of pages is increased when the heuristic observations indicate that the number of available pages of physical memory is greater than a third predetermined number of pages.

14. The method according to claim 1 wherein the second number of pages is increased when the heuristic observations indicate that the number of available pages of physical memory is less than a third predetermined number of pages.

15. A method of allocating memory among a plurality of processes, each process demanding memory resources of a computer system, wherein said computer system comprises a central processing unit and a physical memory comprising a predetermined total number of pages, said processes being either active or inactive, and wherein said computer system is subjected to varying system loads based on the number of processes being handled by the central processing unit, said method comprising the steps of:

allocating to each of said plurality of processes an initial working set comprising a predetermined number of pages of said physical memory;

heuristically monitoring system load parameters to determine said demand for memory resources by said plurality of processes; and periodically changing the number of pages allocated to one or more of said processes based on said system load parameters.

16. The method of claim 15 further comprising the step of:

generating a page fault when a process attempts to access a page not located in its predetermined number of pages; wherein the step of heuristically monitoring system load parameters comprises monitoring one or more of the number of processes that are active and a ratio of memory accesses which result in page faults to memory accesses which do not result in a page fault to determine system load parameters.

17. The method of claim 15 wherein each working set has a minimum number of pages and further comprising the steps of:

determining a free page list size necessary to permit adding pages to each process;

determining whether a current free page list size is larger than said free page list size necessary to permit adding pages to each process; and allocating more than said minimum number of pages to at least one process based on said determination of whether a current free page list size is larger than a current free page list size.

18. The method of claim 17, further comprising the step of determining whether the free page list size is less than a target length for said current free page list.

* * * * *